United States Patent Office 2,966,466
Patented Dec. 27, 1960

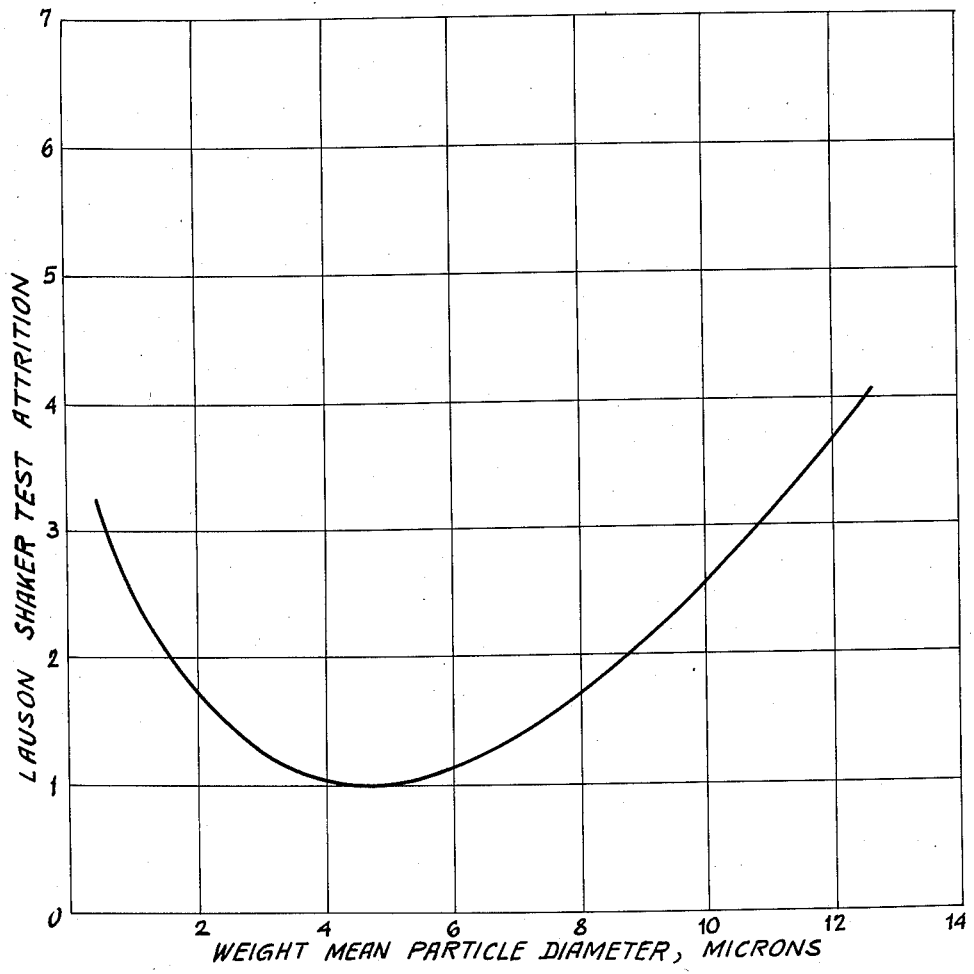

2,966,466

PRODUCTION OF ATTRITION-RESISTANT SILICA-ALUMINA GELS

Albert B. Schwartz, Philadelphia, Pa., assignor to Socony Mobil Oil Company, Inc., a corporation of New York Filed Apr. 11, 1956, Ser. No. 577,465

6 Claims. (Cl. 252—317)

This invention relates to inorganic oxide gels characterized by a high resistance to attrition and to a process for producing such gels. More particularly, the invention is directed to improvement in handling strength of gels and gel composites finding use as adsorbents, desiccants, catalysts, catalyst supports, carriers, and in various other applications where rigidity and ability to withstand abrasion upon handling are considered desirable attributes.

Modern catalytic processes require catalysts which are not only specifically active in the chemical reactions which are to be catalyzed but also possess physical characteristics required for successful commercial operation. One of the outstanding physical attributes of a commercial catalyst is hardness, i.e., the ability to resist attrition. The ability of a particle to hold its shape in withstanding the mechanical handling to which it is subjected upon storage, shipment, and use is a primary requirement for a successful catalyst and for modern catalytic processes.

Thus, many operations for the conversion of hydrocarbon materials are carried out in the presence of inorganic oxide gels which themselves have a catalytic effect or which are impregnated with or act as a support for other catalytic material of a nature appropriate to the result desired. These catalytic processes are generally advantageously carried out employing methods wherein the catalyst or contact mass is subjected to continuous handling. In such operations, a continuously moving stream of hydrocarbon feed is contacted with a continuously moving stream of catalyst for the accomplishment of conversion and thereafter the catalytic material is continuously regenerated and returned to the conversion zone. This continuous handling and regeneration of the catalyst particles results in considerable breakage and constant abrasion, consuming the catalyst and giving rise to an excessive amount of fines which are a loss since they generally cannot be re-used in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard, porous gel catalyst, having the ability to withstand abrasion during the necessary handling involved during continual conversion and regeneration, is definitely desirable in overcoming the aforementioned disadvantages.

Likewise, in those instances where advantage is taken of the adsorbent or desiccant characteristics of inorganic oxide gels, it is highly desirable to employ a gel having the ability to resist attrition and thereby obviate contamination of the material undergoing treatment with gel fines. This is particularly the case where desiccant gel particles are tumbled or otherwise agitated in direct contact with the material being treated.

Inorganic oxide gels employed in the above and various other operations have generally been prepared by the formation of a sol of desired composition that sets to a hydrogel after lapse of a suitable period of time. The hydrogel is then dried to remove the liquid phase therefrom. It has heretofore been suggested that various finely divided water-insoluble solids be added to the sol before the same undergoes gelation for the purpose of increasing the porosity of the ultimate dried gel so that the regeneration characteristics thereof are enhanced upon use in catalytic hydrocarbon conversion operations. It has also been proposed that pulverized dried gel, clay, and similar infusible materials be incorporated in the hydrosol before gelation in order that the hydrogel resulting upon setting of such hydrosol may be subjected to rapid drying without undergoing substantial breakage. The improved regeneration characteristics and the improvement in drying obtained with the aforementioned gels have been attributed to the fact that the finely divided solid contained in the hydrosol does not shrink to the extent that the hydrogel does during drying, thereby creating in the resulting dried gel a large number of macropores having diameters greater than about 1000 Angstrom units. While the gels so prepared containing pulverized infusible material of appreciable particle size exhibit improvement in regeneration and during drying, the physical strength thereof has been weakened due to the presence of large pores in the gel. Specifically, resistance to attrition of such gels has been found to be distinctly less than that of a comparable gel in which the foregoing pulverized material was absent.

Gel preparation has heretofore been carried out by drying hydrogel in a mass, which is subsequently broken up into pieces of desired size. Hydrogel has also been prepared and dried in the form of small pieces of predetermined shape such as obtained by extrusion, pelleting, or other suitable means. In more recent years, gels have been produced in the form of spheroidal bead-like particles. The latter have had the advantage over irregularly shaped gel particles and over those obtained by extrusion or pelleting by being more resistant to attrition. However, since further improvement in resistance to attrition of gel beads, as well as other forms of gel, is a distinct advantage in commercial operation, serving to reduce the overall operating cost of a process utilizing the same, a method for increasing the attrition resistance generally of inorganic oxide gels is highly desirable. The incorporation of finely divided solids of the type referred to hereinabove in the hydrosol used for formation of gel beads has been found to undesirably decrease the hardness characteristics thereof, rendering the gel beads so produced more susceptible to attrition.

One object of the invention, therefore, is to provide an inorganic oxide gel of improved hardness. Another object is the provision of a process for improving the resistance to attrition of a dried gel. A still further object is the provision of improved attrition-resistant spheroidal gel particles. Still another object is to provide a commercially feasible process for producing inorganic oxide gels having unusual resistance to attrition. Other objects and advantages of the invention will be apparent to those skilled in the art from the following description.

In accordance with this invention, it has been discovered that an inorganic oxide gel with unusual resistance to attrition may be prepared by incorporating in an inorganic oxide sol a quantity of pulverized sulfur, having a weight mean particle diameter of between 2 and 8 microns and more particularly between 3 and 6 microns. The amount of pulverized sulfur so incorporated is insoluble in the sol and is generally between about 5 percent and about 30 percent by volume and preferably between about 10 and about 25 percent by volume of the dried gel product. The sulfur-containing inorganic oxide sol sets to a hydrogel after lapse of a suitable period of time and the resulting hydrogel is thereafter dried to a gel and then heated to an elevated temperature sufficient to remove the sulfur by volatilization thereof. It has been found that an inorganic oxide gel resulting from the setting of a sol containing pulverized sulfur of the aforementioned critical particle size, drying of the resulting hydrogel and tempering the dried gel for a sufficient time and at a sufficient temperature to remove the sulfur therefrom unexpectedly has a substantially greater resistance to attrition than inorganic oxide gels containing pulverized sulfur of particle size outside the aforementioned range and even possesses a greater resistance to attrition than comparable gels in which sulfur of the specified particle size has not been incorporated.

Inorganic oxide gels, in general, are improved with regard to hardness characteristics by the method of this invention. Thus, gels of silica, alumina, molybdena, magnesia, chromia, zirconia, thoria, titania, manganese oxide, and composites thereof may be rendered more resistant to attrition by the present process. The gels so prepared may comprise a single inorganic oxide or may be cogels of two or more inorganic oxides. The gel, after preparation, may, if necessary, be impregnated with various materials to impart desired catalytic characteristics thereto. It is contemplated that the inorganic oxide gels prepared in accordance with the present invention may be subjected to any of the uses for which such gels have heretofore been employed. Instant gels are of particular value in processes where attrition has been a prevalent problem. Representative, but non-limiting, uses of the present gels are as catalysts, catalyst supports, adsorbents, desiccants, and zeolites. The particular composition of the gel will largely be governed by its intended use.

Likewise, the particular physical form of the gel will be determined principally by the use to which it is to be subjected. The process described herein may be employed in preparation of the gel in any desired physical form. Thus, the hydrosol containing pulverized sulfur may be permitted to set in mass to a hydrogel which is thereafter dried and tempered at a temperature sufficient to remove the sulfur therefrom. The pieces of gel so obtained are generally of irregular shape. Uniformly shaped pieces of gel may be obtained by extrusion or pelleting of the powder-containing hydrogel. Also, the hydrosol may be introduced into the perforations of a perforated plate and retained therein until the sol has set to a hydrogel, after which the formed hydrogel pieces are removed from the plate. The method of the invention is especially useful as applied to the manufacture of spherically shaped gel particles produced by introducing drops of hydrosol into a water-immiscible liquid wherein the hydrosol sets to spheroidal bead-like particles of hydrogel. Larger size spheres are ordinarily within the range of from about 1/64 to about 1/4 inch in diameter, whereas smaller size spheres, which are generally referred to as microspheres, are within the range of from about 10 to about 100 microns in diameter. The use of spherically shaped gel particles is of particular advantage as catalysts in hydrocarbon conversion processes, including the moving catalyst bed process, the fluidized process, etc., in which the spheroidal gel particles are subjected to continuous movement. As applied to the stationary bed, spheroidal gel catalyst particles provide effective contact between the reactants and the catalyst by avoiding channeling.

It is accordingly a preferred embodiment of the present invention to prepare the described attrition-resistant gel in the form of spheres although it is to be realized that the method hereinafter set forth may also be employed in obtaining a mass of gel which may thereafter be broken up into particles of desired size. Likewise, the method described herein may be used for the preparation of inorganic oxide gels in the form of particles of any other desired size or shape.

In accordance with the process of the invention, an inorganic oxide hydrosol is prepared containing between about 5 and about 30 percent by volume, based on the ultimately dry gel, of pulverized sulfur having a weight mean particle diameter of between 2 and 8 microns and preferably between 3 and 6 microns. It has been found, as will be evident from data hereinafter set forth, that the above particle size is an essential and critical factor in imparting the desired attrition resistance to the prepared gel. The pulverized sulfur may be added by dispersing in an already prepared hydrosol or, as is preferable where the hydrosol is characterized by a short time of gelation, the powdered sulfur may be added to one or more of the reactants used in forming the hydrosol or may be admixed in the form of a separate stream with streams of the hydrosol-forming reactants in a mixing nozzle or other means where the reactants are brought into intimate contact.

The particle size distributions of the pulverized sulfur incorporated in the hydrosol in accordance with the present process were determined by sedimentation methods. The weight mean particle diameters were determined by plotting the cumulative percent of powdered sulfur smaller than a given diameter against particle diameter, dividing the total size range into a number of small fractions and calculating as follows:

$$\text{Weight mean diameter} = \frac{\sum d_i g_i}{\sum g_i}$$

where $d_i$ is the mean particle size of the fraction in microns and $g_i$ is the corresponding weight percent material in the fraction. The percent volume pulverized sulfur in the dried gel was calculated from the particle densities of powdered sulfur, i.e., the density of the material, excluding void space between the particles but including pore volume of the particles and of dried gel which contained no added sulfur.

The form of hydrogel is generally maintained substantially constant from a time prior to gelation until after the gel has been dried. During drying, the hydrogel undergoes considerable shrinkage. Drying is carried to a stage beyond that at which maximum shrinkage of the gel is obtained. The gel, after syneresis or shrinkage thereof has been completed, is substantially dry; that is, the gel possesses open pores free of liquid although it still contains a relatively small percentage of water which is evolved upon subjecting the gel to a relatively high temperature. Hydrogel containing powdered sulfur dispersed therein, prepared as in the present process, may be dried at room temperature or at higher temperatures in air or steam, as well as in various inert or reducing atmospheres. While the prepared hydrogel may be dried at ambient temperature by merely exposing to the air, it is preferred to accelerate the removal of liquid phase from the hydrogel by drying at a temperature in the range of about 150° F. to about 400° F. until shrinkage of the hydrogel is substantially complete. Drying is preferably carried out in superheated steam.

After drying, the gel is heated for a sufficient time and at a sufficiently elevated temperature to remove the pulverized sulfur therefrom. Such step generally entails heating the gel at a temperature above 500° F. and not in excess of about 1300° F. for a time sufficient to remove the pulverized sulfur contained in the gel. The rate of heating should be sufficiently slow as not to disrupt the gel. Generally, the rate of heating during this period is desirably maintained at less than 10° F./minute, although it will be realized that such rate of heating may be exceeded where only a small amount of pulverized sulfur has been originally incorporated in the gel or remains in the gel after removal of the bulk of sulfur therefrom. Thus, while the aforesaid specified controlled rate of heating will generally be employed, it will be understood that the same is not critical to the success of the instant process so long as the heating rate is sufficiently slow as not to disrupt the gel product.

The atmosphere in which the above heating step is carried out may be an oxygen-containing gas, for example, air, in which case the sulfur is removed from the gel in the form of sulfur dioxide. Alternatively, the heating may be accomplished in an inert non-oxidizing atmosphere such as carbon dioxide, steam, nitrogen, flue gas, and the like, in which instance the sulfur is removed from the gel in the form of sulfur vapors. In the latter embodiment, the sulfur vapors are suitably collected, condensed and ground to the requisite particle size for re-use in imparting desired attrition resistance to the gel being prepared.

The above-described drying and heating of the gel containing pulverized sulfur may be carried out as separate steps in which drying is initially effected and thereafter the dried gel subjected to an elevated temperature sufficient to remove the sulfur therefrom or the drying and heating may be part of a single operation in which the gel is first dried and thereafter heated at an increasing temperature to remove the sulfur.

The process of the invention may be carried out on a batch, semi-batch, or continuous basis. Thus, the hydrosol formed, containing powdered sulfur as described hereinabove, may be conducted into setting tubs and allowed to remain therein for a sufficient time to effect gelation, after which the resulting hydrogel is removed, broken up into pieces of desired size, base-exchanged if necessary or desirable, and washed to remove soluble matter therefrom. The washed hydrogel is thereafter dried and calcined at an elevated temperature sufficient to remove the powdered sulfur therefrom. The instant process, as indicated above, has been found to be particularly useful for the production of gel in the form of spheroidal particles. The hydrosol containing powdered sulfur produced in accordance with this invention may be made into spheroidal particles by any feasible process, such as the methods described in patents to Marisic, for example, U.S. 2,384,946. Broadly, such methods involve introducing globules of hydrosol into a column of water-immiscible liquid; for example, an oil medium wherein the globules of hydrosol set to a hydrogel and subsequently pass into an underlying layer of water from which they are sluiced to further processing operations, such as hydrothermal treatment, base-exchange, water-washing, drying, and calcining.

The resulting hydrogel may, if desired, be initially subjected to a hydrothermal treatment, i.e., contacting the hydrogel with water at an elevated temperature for a specified period of time. Such treatment, however, is not considered essential to the success of the present process in affording a hard, attrition-resistant gel. The hydrogel is thereafter water-washed to remove soluble material. In those instances where it is desirable to remove zeolitic alkali metal introduced into the hydrogel through the use of an alkali metal silicate reactant, the hydrogel may be base-exchanged with a suitable aqueous solution before water-washing. The base-exchange solution may be one capable of replacing zeolitic alkali metal without the introduction of an additional metal or metal compound into the hydrogel, such as a solution of an ammonium salt or an acid. By using a base-exchange solution of a metal salt other than a metal already contained in the hydrogel, it is possible to introduce quantities of an additional metal oxide into the hydrogel composite. The incorporation of such additional metal oxide into the hydrogel may desirably act as a catalytic promoter under particular reaction conditions. After water-washing free of soluble material, the resulting hydrogel containing powdered sulfur is dried and calcined to yield a highly attrition-resistant gel. The drying and calcining steps may, of course, be part of a continuous operation wherein the hydrogel is subjected to gradually increasing temperatures during which it is dried, and thereafter subjected to a sufficiently elevated temperature to remove the sulfur therefrom.

It is preferred to have a dispersing agent present in the hydrosol containing dispersed powdered sulfur. By incorporating a dispersing agent in the hydrosol along with the powdered sulfur, it has been found that tendency of the powdered sulfur to agglomerate is prevented. The dispersing agent may be added to the hydrosol in any feasible manner, for example, by adding to the sulfur to be incorporated in the hydrosol prior to grinding thereof or during grinding to the requisite particle size. Alternatively, the dispersing agent may be added to the hydrosol containing powdered sulfur before the same sets to a hydrogel, or the dispersing agent may be introduced with one of the reactant solutions used to form the hydrosol. The dispersing agent employed may be either of the ionic or non-ionic type. Typical suitable dispersing agents include ethylene oxide polymers, ethylene oxide-alkyl phenol polymers, fatty acid soaps, such as the alkali metal salts of such fatty acids as oleic, linoleic, stearic, linolinic, and palmitic acids, alkyl sulfonate salts, inorganic and organic acids, gum arabic, sodium hexametaphosphate, lecithin, aralkyl sulfonates, alkylated phenol sulfonates, sodium pyrophosphate, partial esters of polyhydroxyalcohols, salts of lignin sulfonic acid, tannic acid, sodium silicate, and the like. The quantity of dispersing agent required is generally very small. The particular amount of such agent introduced into the hydrosol will, of course, depend on the quantity of pulverized sulfur present and ordinarily will not exceed about 2 percent by weight based on the sulfur.

The powdered sulfur incorporated in the hydrosol is suitably prepared by grinding or ball-milling the same with or without added water to the requisite particle size. During such operation the aforementioned dispersing agents may be added to facilitate break-down and deflocculation of the sulfur.

The intermediate hydrogel state obtained in preparation of present gels is to be distinguished from a gelatinous precipitate. True, all-embracing hydrogels occupy the entire volume of the solution from which they are formed and possess a definitely rigid structure. When fractured, a true hydrogel shows a conchoidal fracture as compared to an irregular ragged edge fracture observed in the case of gelatinous precipitates. The latter, moreover, occupy only a part of the volume of the solution from which they are formed and have no rigidity of structure. In addition, hydrogels can generally be more easily washed free of soluble impurities due to the tendency of gelatinous precipitates to peptize on washing. A distinct and further advantage of hydrogels is that, due to the rigid structure, they can be formed into high quality spheroidal particles.

The attrition characteristics of the gels prepared in accordance with the method described herein were determined by an attrition test known as the Lauson shaker test. The procedure used in the test consists of shaking a 50 cc. sample of the product to be tested in a closed steel cup which is bolted to the piston of a motor-driven Lauson engine which operates at 1350 r.p.m. After shaking for 10 seconds, the catalyst fines produced, passing through a 10-mesh (Tyler) screen, are replaced with an equal weight of fresh catalyst make-up. These operations are repeated for 20 cycles or until the amount of fines produced during successive cycles remains essentially constant. The attrition (fines loss per cycle), expressed as percent of original sample, is plotted against the cumulative weight percent replacement. The equilibrium weight percent fines as read from this plot is reported as the Lauson shaker test attrition.

The following example will serve to illustrate the product and process of the present invention without limiting the same:

Silica-alumina gel containing a small amount of chromia was prepared by mixing streams comprising: (1) aluminum sulphate dissolved in an aqueous solution of sulphuric acid and (2) sodium silicate solution containing powdered sulfur of specified particle size. The sulphuric acid-aluminum sulphate stream was composed of 3.79 pounds of 96.9 percent sulphuric acid, 7.74 pounds of aluminum sulphate (containing 43 percent weight water), 0.315 pound of potassium chrome alum, and 117 pounds of water. The sodium silicate stream containing pulverized sulfur was composed of 46.0 pounds sodium silicate having an $Na_2O$ to $SiO_2$ ratio of 1:3.22 and a density of 41° Bé., 46.4 pounds of water, 7.64 pounds of sulfur powder having a weight mean particle diameter of 4.7 microns and about 1 percent by weight (based on sulfur) of a dispersing agent of a calcium salt of lignin sulfonic acid, known commercially as "Marasperse C."

Four hundred sixty cc./min. of the sulphuric acid-aluminum sulphate and 467 cc./min. of the sodium silicate slurry were mixed in a mixing nozzle to form a sol, which set to a hydrogel in 3.0 seconds at 65° F. The sol was formed into spheroidal hydrogel beads by introducing globules of the sol into an oil medium such as described in the aforementioned Marisic patent. The resulting hydrogel particles, having a pH of 8.5 were treated for 1 hour at 120° F. while covered with water. The hydrogel particles were thereafter base-exchanged with an aluminum sulphate solution to remove sodium from the structure of the gel, washed free of soluble salts, dried in superheated steam at 280° F. for 2 hours. The resulting gel containing 23 percent by volume of powdered sulfur was then tempered by heating in air at a rate of 5° F./min. to a temperature of about 1000° F. and then heated further to 1300° F. and held at such temperature for 3 hours. Sulfur vapors began to appear in the effluent gas at about 500° F. Most of the sulfur was vaporized in the temperature range of 800–900° F. Any remaining sulfur was removed at temperatures above this range so that the resultant tempered gel was free of sulfur. This gel had a Lauson shaker test attrition of 1.0. Gel of the same composition, prepared similar to above, with the exception that no pulverized sulfur was introduced into the sol showed a Lauson shaker test attrition of 4.7.

The effect of particle size of the powdered sulfur incorporated in the sol and subsequently removed therefrom on the Lauson shaker test attrition of other gels prepared following the general procedure described above is shown graphically in the attached figure. It will be seen from this figure that minimum attrition is achieved with sulfur having a weight means particle diameter of between 2 and 8 microns and particularly between 3 and 6 microns. It is evident from this figure that close control of the particle size of the powder within the aforementioned range is essential in achieving the exceptional resistance to attrition obtained with present gels.

I claim:

1. A method for preparing a silica-alumina gel characterized by high resistance to attrition, which comprises dispersing in a silica-alumina sol, characterized by an inherent capacity to set to a hydrogel upon lapse of a suitable period of time, an amount corresponding to between about 5 and about 30 percent by volume of the dried gel of powdered sulfur having a weight mean particle diameter of between 2 and 8 microns, allowing said sol containing the powdered sulfur to set to a hydrogel and heating the resulting hydrogel at a rate sufficiently slow as to avoid disruption thereof to an elevated temperature sufficient to remove the sulfur therefrom.

2. A method for preparing a silica-alumina gel characterized by high resistance to attrition, which comprises dispersing in a silica-alumina sol, characterized by an inherent capacity to set to a hydrogel upon lapse of a suitable period of time, an amount corresponding to between about 10 and about 25 percent by volume of the dried gel of powdered sulfur having a weight mean particle diameter of between 3 and 6 microns, allowing said sol containing the powdered sulfur to set to a hydrogel and heating the resulting hydrogel at a rate sufficiently slow as to avoid disruption thereof to an elevated temperature sufficient to remove the sulfur therefrom.

3. A method for preparing a silica-alumina gel characterized by high resistance to attrition, which comprises dispersing in a silica-alumina sol, characterized by an inherent capacity to set to a hydrogel upon lapse of a suitable period of time, an amount corresponding to between about 5 and about 30 percent by volume of the dried gel of powdered sulfur having a weight mean particle diameter of between 2 and 8 microns and a dispersing agent, allowing said sol containing the powdered sulfur and dispersing agent to set to a hydrogel and heating the resulting hydrogel at a rate sufficiently slow as to avoid disruption thereof to an elevated temperature sufficient to remove the sulfur therefrom.

4. A method for preparing spheroidal particles of a silica-alumina gel characterized by high resistance to attrition, which comprises dispersing in a silica-alumina sol, characterized by an inherent capacity to set to a hydrogel upon lapse of a suitable period of time, an amount corresponding to between about 5 and about 30 percent by volume of the dried gel of powdered sulfur having a weight mean particle diameter of between 2 and 8 microns, introducing globules of said sol containing powdered sulfur into a water-immiscible liquid wherein the hydrosol globules set to spheroidal particles of hydrogel, drying the resulting spheroidal hydrogel particles and calcining the dried particles at a rate sufficiently slow as to avoid disruption thereof to an elevated temperature sufficient to remove the sulfur therefrom.

5. A method for preparing spheroidal particles of a silica-alumina gel characterized by high resistance to attrition, which comprises dispersing in a silica-alumina sol, characterized by an inherent capacity to set to a hydrogel upon lapse of a suitable period of time, an amount corresponding to between about 10 and about 25 percent by volume of the dried gel of powdered sulfur having a weight mean particle diameter of between 3 and 6 microns, introducing globules of said sol containing powdered sulfur into a water-immiscible liquid wherein the hydrosol globules set to spheroidal particles of hydrogel, drying the resulting spheroidal hydrogel particles and calcining the dried particles at a rate sufficiently slow as to avoid disruption thereof to an elevated temperature sufficient to remove the sulfur therefrom.

6. A method for preparing a silica-alumina gel characterized by high resistance to attrition, which comprises dispersing in a silica-alumina sol, characterized by an inherent capacity to set to a hydrogel upon lapse of a suitable period of time, an amount corresponding to between about 5 and about 30 percent by volume of the dried gel of powdered sulfur having a weight mean particle diameter of between 2 and 8 microns, allowing said sol containing the powdered sulfur to set to a hydrogel, heating the resulting hydrogel in an inert nonoxidizing atmosphere at a rate sufficiently slow as to avoid disruption thereof to an elevated temperature sufficient to volatilize the sulfur contained therein, collecting and condensing the resulting vaporized sulfur, grinding said collected sulfur to particles of the aforesaid diameter and re-using said ground sulfur by dispersing the same in a silica-alumina sol.

References Cited in the file of this patent

UNITED STATES PATENTS

| | | |
|---|---|---|
| 2,097,634 | Malan et al. | Nov. 2, 1937 |
| 2,487,065 | Milliken | Nov. 8, 1949 |
| 2,669,547 | Shabaker | Feb. 16, 1954 |